O. M. PRUITT.
AIR LIFT SEPARATOR PUMP.
APPLICATION FILED JULY 19, 1917.
Reissued Aug. 24, 1920.
14,937.
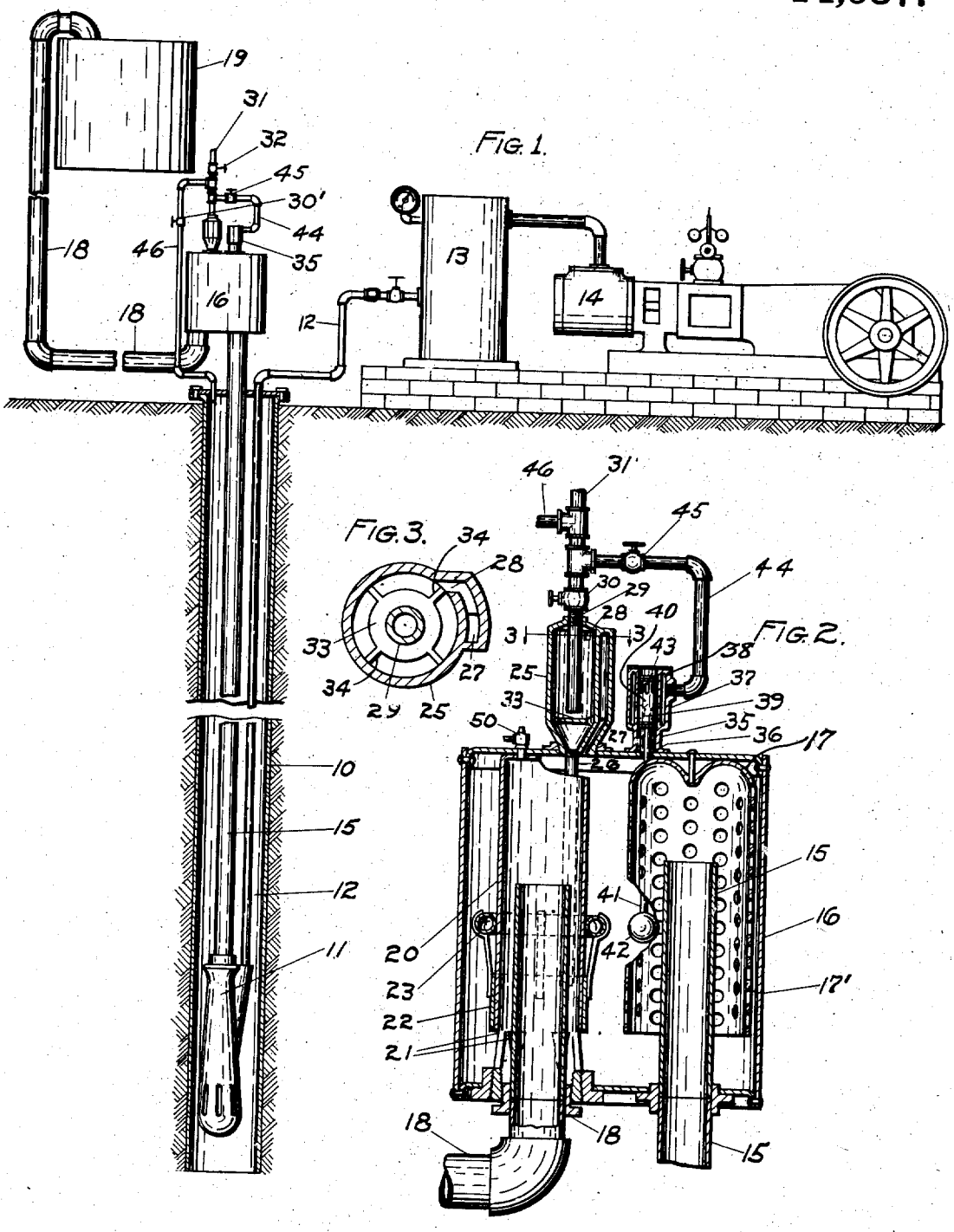
INVENTOR
ORAN M. PRUITT
BY Lockwood & Lockwood
ATTORNEYS

UNITED STATES PATENT OFFICE.

ORAN M. PRUITT, OF INDIANAPOLIS, INDIANA, ASSIGNOR TO INDIANA AIR PUMP COMPANY, OF INDIANAPOLIS, INDIANA, A CORPORATION OF INDIANA.

AIR-LIFT SEPARATOR-PUMP.

14,937. Specification of Reissued Letters Patent. Reissued Aug. 24, 1920.

Original No. 1,214,951, dated February 6, 1917, Serial No. 93,635, filed April 26, 1916. Application for reissue filed July 19, 1917. Serial No. 181,619.

*To all whom it may concern:*

Be it known that I, ORAN M. PRUITT, a citizen of the United States, residing at Indianapolis, in the county of Marion and State of Indiana, have invented a new and useful Air-Lift Separator-Pump, of which the following is a specification.

In the operation of airlift pumps, it is sometimes desirable to use the water directly in a closed system, or to send it directly into condensing or cooling coils, or to move the water horizontally after it has been raised to the ground level and then to raise the water still higher into the desired reservoir; and in all these cases to obtain a steady stream. It is very necessary, however, first to remove the air from the water in order to do these things, as otherwise the air and water will separate later and the flow of the water will be greatly interfered with. It has already been proposed to separate the air from the water at the top of the well by means of a separating chamber, by which the pressure of the separated air is utilized to force the water on into the associated system. The accumulated air in this separating chamber must be allowed to escape as it accumulates, so as to maintain the proper pressure and proper water level therein and a constant flow of water therefrom.

It is the object of my invention to provide means for controlling both the escape of air and water from such a separating chamber, whereby a constant stream of air-free water is supplied from such separating chamber to the associated system.

The accompanying drawing illustrates my invention. Figure 1 is a diagrammatic view showing a well having an air-lift separator pump embodying my invention; Fig. 2 is an enlarged vertical sectional view of the separator; and Fig. 3 is an enlarged section on the line 3—3 of Fig. 2.

At a suitable depth within the well casing 10 is located the airlift pump 11 of any suitable type, which airlift pump receives water from within the well casing 10, and receives air from an air-supply pipe 12 supplied from a reservoir 13 in which the pressure is maintained by any suitable compressor 14. The mixture of air and water produced within the pump 11 rises by the eduction pipe 15 and is discharged into a separating chamber 16, the eduction pipe 15 preferably extending through the bottom of the separating chamber and well up into it and being covered by a suitable umbrella or mushroom plate 17 with sides 17′ overhanging the upper end of the eduction pipe 15 so as to deflect downward the water discharged from the eduction pipe 15 and allow the escape of the air from such water, the mushroom plate 17 and the perforations in the depending sides 17′ assisting in the separation of air and water, and the perforations allowing the water to escape from within the perforated sides 17′ more freely, so as to steady the level of the water in the separating chamber 16. A water discharge pipe 18 projects into the chamber 16, preferably through the bottom thereof, and may be carried horizontally to any desired point and then turned upward to discharge into any suitable system, here a suitable reservoir 19, as clear from Fig. 1. The intake end of the water discharge pipe 18 within the casing 16 is located within a cylinder or bell 20, which at the bottom is provided with inlet openings 21, preferably wider at the top than at the bottom, as shown in Fig. 2. A cut-off ring 22 has a sliding fit on the cylinder 20 and is carried by an annular float 23 surrounding such cylinder, so that such cut-off ring rises and falls with the water level within the casing 16 and closes to a greater or less degree the openings 21 as the water level in such casing falls, so as to diminish the size of the outlet openings when the pressure above the water in the casing 16 (by which pressure the water level is depressed) increases, thus tending to maintain the outflowing stream through the pipe 18 constant.

A hollow cylindrical shell 25 is mounted on the top of the casing 16, by an air-tight mounting, and preferably has a conical bottom which leads into a pipe 26 projecting down within the casing 16 to a point below the lowest water level therein. The shell 25 is provided at one side with an upwardly extending passage 27 outside the main body of such shell, which passage 27 opens at its lower end into the upper part of the casing 16 and at its upper end discharges by a passage 28 leading tangentially into the shell 25 at its upper end. A pipe 29 projects axially into the shell 25 from the top, preferably nearly to the bottom of such shell 25, and is provided with a control valve 30 through which it leads to the air escape pipe 31, in which is a control valve 32. The air from within the upper part of the casing 16, mixed with whatever water it still carries, passes up through the chamber 27 and is discharged by the passage 28 tangentially within the shell 25, and circulates in a descending helix within such shell. The centrifugal action of this helical motion produces a separation of the air from whatever water it still carries, the air coming to the center and the water to the outside. The air then escapes through the pipe 29, while the water returns through the pipe 26 into the casing 16. The escape of air is controlled by the valve 30, which is regulated to maintain the water level within the casing 16 at the desired point. This normally maintains the air pressure within the casing 16 substantially constant, and the water level therein at a substantially fixed point. However, if the air pressure increases and the water level, therefore, falls, the float 23 descends and partly closes the openings 21 so as to maintain the stream of water passing through the pipe 18 substantially constant in spite of such variation in air pressure and water level. In order to prevent an increase of pressure within the separating chamber 16 from causing a sudden rush of water up through the pipes 29 and 31, a deflecting plate 33 is provided in the shell 25 below the lower end of the pipe 29 and above the pipe 26 and conveniently supported by spaced arms 34 from the walls of said shell. If water is shot up from the pipe 26, it strikes the deflecting plate 33 and is prevented thereby from entering the pipe 29.

To supplement the air escape through the pipe 29 when necessary, I provide a vertical float-operated slide valve, comprising an outer casing 35 which communicates through an opening 36 with the upper part of the space within the casing 16, an annular jacket 37 around such casing 35 at the upper end thereof to provide therewith an annular space 38 which is connected by ports 39 with the interior of the casing 35, and a hollow vertically sliding member 40 connected by a rod 41 passing through the hole 36 to a float 42 within the casing 16. The hollow sliding member 40 is unperforated at its lower portion so as to cover the slots 39 when it is elevated, but is provided at its upper portion with slots 43 which register with the slots 39 when the sliding member 40 descends so as to allow escape of air through the hole 36, the slots 43, and the slots 39 to the annular space 38, which is connected by a pipe 44, through a control valve 45 if desired, to the air escape pipe 31.

If desired, the air escape pipe may be connected by an overflow pipe 46 to the interior of the well casing 10, so that in case any water is carried up into said air escape pipe, as sometimes happens, such water will overflow back into the well and will not escape on to the surrounding ground or floor. This pipe 46 is opened or closed by means of a valve 30′. In order to compel such water to flow into the well, the valve 32 may be partly or wholly closed, when partly closed permitting air to escape through the pipe 31 into the atmosphere but preventing any rush of water throughout the pipe 31.

In operation, the compressor 14 maintains the desired air pressure within the reservoir 13, from which air is withdrawn through the pipe 12 and discharged through the airlift pump 11, which causes the mixture of air and water to rise through the eduction pipe 15 in the usual manner. This mixture of air and water is discharged from the top of the eduction pipe 15 against the under side of the mushroom plate or umbrella 17, which partly separates the air and water, deflecting the water downward to the bottom of the chamber 16 and allowing the air to escape through the holes in the depending sides of such mushroom plate. The air accumulates in the upper part of the chamber 16, and the water in the lower part, and the pressure of the air forces the water through the slots 21 and upward within the cylinder 20 and over the top of the intake end of the pipe 18, and along such pipe horizontally and then vertically into the reservoir 19 or elsewhere. The air in the upper part of the chamber 16 still may carry considerable water, and this air passes up through the passage 27 and is discharged therefrom through the opening 28 tangentially within the shell 25, wherein it circulates in a descending helix to throw to the outside any water it still carries and bring the air to the inside, the water returning through the pipe 26 into the chamber 16 and the air escaping through the pipe 29, valve 30, and pipe 31 into the atmosphere or through the pipe 46 into the well casing. The valve 30 is adjusted to allow air normally to escape just sufficiently rapidly to maintain the water level within the casing 16 at the desired point. If for any reason this valve 30 does not allow the air to escape from the chamber 26 with sufficient rapidity, the water level within such chamber falls and the floats 23 and 42 descend. The descent of the float 23 causes the cut-off ring 22 to close partially the slots 21, so as to diminish the outlet area into the pipe 18 and thus compensate by decreasing such outlet area for the increase in air pressure so as to maintain the stream of water discharged through the pipe 18 substantially constant. If the water level in the chamber 16 continues to fall, the descent of the float 42 causes the slide valve 40 to produce registry of the openings 43 and 39 so as to permit a supplemental escape of air through such slide valve and pipe 44 and valve 45. Normally, the slide valve 40 is closed, and only comes into play as a supplemental air-escape means when the air escaping through the valve 30 is not sufficient in amount and the cut-off ring 22 has partially closed the slots 21. If the air escapes too rapidly the floats 23 and 42 rise and the reverse of the foregoing regulation takes place. In case any water is carried up either through the pipe 29 or the pipe 44 into the pipe 31, it is carried back through the pipe 46 into the well.

As a result of my arrangement, the stream of water discharged through the pipe 18 may be maintained substantially constant and substantially air-free.

Sometimes, however, the separation of the air from the water is not entirely complete when the water enters through the slots 21, so that some air is carried with the water into the cylinder 20, this air, though small in amount, might separate from the water within the cylinder 20, and collect at the top of such cylinder, and in the course of time might make the system "airbound." In order to prevent this, I provide a pet cock 50 which connects the space within the upper end of the cylinder 20 with the atmosphere, so as to provide a restricted escape vent for any air which may collect. By proper adjustment of the pet cock 50, any air which collects in the cylinder 20 may be permitted to escape while the vent is sufficiently restricted so as to prevent any material amount of water from passing through.

I claim as my invention:

1. An airlift separator pump, comprising an airlift pump having an eduction pipe, a separating chamber into which said eduction pipe discharges, said separating chamber having an outlet for permitting escape of air from the upper part thereof, a water outflow pipe leading from said chamber, and a float-controlled valve controlling the inlet to said water-outflow pipe, said float-controlled valve moving toward open and closed positions upon rise and fall respectively of the water level in said separating chamber.

2. An airlift separator pump, comprising an airlift pump having an eduction pipe, a separating chamber into which said eduction pipe discharges, said separating chamber having an outlet for permitting escape of air from the upper part thereof, a water outflow pipe leading from said chamber, and a float-controlled valve controlling the inlet to said water-outflow pipe.

3. An airlift separator pump, comprising an airlift pump having an eduction pipe, a separating chamber into which said eduction pipe discharges, said separating chamber having an outlet for permitting escape of air from the upper part thereof, a water outflow pipe having its intake end projecting upward into said separating chamber, a bell surrounding the intake end of said water-outflow pipe, said bell being provided with a water-admitting slot wider at the top than at the bottom, a cut-off ring slidable on said bell to variably open and close said slot, and a float carrying said cut-off ring and movable upon change in water level in said separating chamber to vary the position of said cut-off ring and the effective size of opening of said slot.

4. An airlift separator pump, comprising an airlift pump having an eduction pipe, a separating chamber into which said eduction pipe discharges, said separating chamber having an outlet for permitting escape of air from the upper part thereof, a water-outflow pipe having its intake end projecting upward into said separating chamber, a bell surrounding the intake end of said water-outflow pipe, said bell being provided with a water admitting slot, a cut-off ring slidable on said bell to variably open and close said slot, and a float carrying said cut-off ring and movable upon change in water level in said separating chamber to vary the position of said cut-off ring and the effective size of opening of said slot.

5. An airlift separator pump, comprising an airlift pump having an eduction pipe, a separating chamber into which said eduction pipe discharges, a water-outflow pipe leading from said chamber, a shell mounted on the top of said separating chamber and having a water-return pipe leading therefrom into said separating chamber below the minimum water level therein and also having a passage leading from the top of said separating chamber tangentially into the upper part of said shell, an air-escape pipe projecting into the middle of said shell, and a valve controlling the effective size of said air-escape pipe.

6. An airlift separator pump, comprising an airlift pump having an eduction pipe, a separating chamber into which said eduction pipe discharges, a water-outflow pipe leading from said chamber, a shell mounted on the top of said separating chamber and having a water return pipe leading therefrom into said separating chamber below the minimum water level therein and also having a passage leading from the top of said separating chamber tangentially into the upper part of said shell, and an air-escape pipe projecting into the middle of said shell.

7. An airlift separator pump, comprising an airlift pump having an eduction pipe, a separating chamber into which said eduction pipe discharges, a water-outflow pipe leading from said chamber, said separating chamber having a primary air outlet for allowing escape of air from the upper part of said separating chamber, a manually controlled valve controlling said primary air escape outlet, and said separating chamber also having a supplemental air-escape outlet for allowing escape of air from the upper part of said separating chamber under abnormal conditions, and a float-operated valve responsive to the water level in said separating chamber and controlling said supplemental air-escape outlet.

8. An airlift separator pump, comprising an airlift pump having an eduction pipe, a separating chamber into which said eduction pipe discharges, a water-outflow pipe leading from said chamber, said separating chamber having a primary air outlet for allowing escape of air from the upper part of said separating chamber, and also having a supplemental air-escape outlet for allowing escape of air from the upper part of said separating chamber under abnormal conditions, and a float-operated valve responsive to the water level in said separating chamber and controlling said supplemental air-escape outlet.

9. An air-lift separator pump, comprising an airlift pump having an eduction pipe, a separating chamber into which said eduction pipe discharges, a water-outflow pipe leading from said chamber, said separating chamber having a primary air outlet for allowing the escape of air from the upper part of said separating chamber, and also having a supplemental air-escape outlet for allowing escape of air from the upper part of said separating chamber under abnormal conditions, and a float-controlled valve responsive to the water level in said separating chamber and controlling the size of the inlet opening to said water-outflow pipe.

10. An airlift separator pump, comprising an airlift pump having an eduction pipe, a separator chamber into which said eduction pipe discharges, a water-outflow pipe leading from said chamber, said separating chamber having a primary air outlet for allowing escape of air from the upper part of said separating chamber, and also having a supplemental air-escape outlet for allowing escape of air from the upper part of said separating chamber under abnormal conditions, a float-operated valve responsive to the water level in said separating chamber and controlling said supplemental air escape outlet, and a float-controlled valve responsive to the water level in said separating chamber and controlling the size of the inlet opening to said water-outflow pipe.

11. An airlift separator pump, comprising an air-lift pump having an eduction pipe, a separating chamber into which said eduction pipe discharges, a water-outflow pipe leading from said chamber, a float controlled valve controlling the escape of air from the top part of said separating chamber, and a float-controlled valve controlling the inlet to said water-outflow pipe, said two valves operating oppositely upon a variation in the water level in said separating chamber.

12. An airlift separator pump, comprising an airlift pump having an eduction pipe, a separating chamber into which said eduction pipe discharges, a water-outflow pipe leading from said chamber, a float-controlled valve controlling the escape of air from the top part of said separating chamber, and a float-controlled valve controlling the inlet to said water-outflow pipe.

13. An airlift separator pump, comprising an airlift pump having an eduction pipe, a separating chamber into which said eduction pipe discharges, a water-outflow pipe leading from said chamber, a float-controlled valve controlling the escape of air from the top part of said separating chamber, and a float-controlled valve controlling the inlet to said water-outflow pipe, said first-named valve opening and said second-named valve closing upon a fall in the water level in said separating chamber.

14. An airlift separator pump, comprising an airlift pump having an eduction pipe, a separating chamber into which said eduction pipe discharges, a water out-flow pipe leading from said chamber, a shell mounted on the top of said separating chamber and having a water-return pipe leading therefrom into said separating chamber below the minimum water level thereon and also having a passage leading from the top of said separating chamber tangentially into the upper part of said shell, an air-escape pipe projecting into the middle of said shell, a valve controlling the effective size of said air-escape pipe and a float-controlled valve responsive to the water level in such separating chamber and controlling the inlet area of said water outflow pipe.

15. An airlift separator pump, comprising an airlift pump having an eduction pipe, a separating chamber into which said eduction pipe discharges, a water-outflow pipe leading from said chamber, a shell mounted on the top of said separating chamber and having a water-return pipe leading therefrom into said separating chamber below the minimum water level therein and also having a passage leading from the top of said separating chamber tangentially into the upper part of said shell, an air-escape pipe projecting into the middle of said shell, and a float-controlled valve responsive to the water level in such separating chamber and controlling the inlet area of said water outflow pipe.

16. An airlift separator pump, comprising an airlift pump having an eduction pipe, a separating chamber into which said eduction pipe discharges, said separating chamber having an outlet for permitting the escape of air from the upper part thereof, a water-outflow pipe leading from said chamber and having its inlet end projecting upward into said chamber, a bell overhanging the intake end of said water-outflow pipe, said bell being provided with a vent connecting the interior of said bell with a point outside said separating chamber, and a valve controlling said vent.

17. An airlift separator pump, comprising an airlift pump having an eduction pipe, a separating chamber into which said eduction pipe discharges, said separating chamber having an outlet for permitting the escape of air from the upper part thereof, a water-outflow pipe leading from said chamber and having its inlet end projecting upward into said chamber, a bell overhanging the intake end of said water-outflow pipe, said bell being provided with a vent connecting the interior of said bell with a point outside said separating chamber.

18. In combination, a closed chamber, a pipe leading from a well into such chamber and opening into said chamber above the liquid level therein, an air nozzle in such pipe below such chamber, a pipe leading from such chamber and opening into such chamber below the liquid level therein, a downwardly opening hood located in said chamber and having its open end below the liquid level therein, said first named pipe discharging upwardly into said chamber and said last named pipe opening under said hood, said chamber having an air outlet opening therefrom which air outlet opening communicates with the chamber at a point higher than the liquid level therein, and a manually operated valve wholly controlling said air outlet opening to permit the escape of air from said chamber but to maintain a pressure greater than atmosphere in said chamber.

19. In combination, a closed chamber, a pipe leading from a well and discharging upwardly substantially vertically into such chamber, an air nozzle in such pipe below such chamber, a pipe leading from such chamber, a hood in such chamber over the end of said last named pipe, said hood having its lower end open below the liquid level in said chamber and having its upper end closed, a container which is connected to said last named pipe to receive the discharge therefrom, said chamber having an air outlet opening therefrom, which air outlet opening communicates with the chamber at a point higher than the liquid level therein, and a manually operated valve wholly controlling said air outlet opening to permit the escape of air from said chamber but to maintain a pressure greater than atmosphere in said chamber.

20. In combination, a closed chamber, a pipe leading from a well into such chamber, an air nozzle in such pipe below such chamber, a pipe leading from such chamber, a hood in said chamber over the end of said last named pipe, said hood having its lower end open below the liquid level in said chamber and having its upper end closed, said chamber having an air outlet opening therefrom which air outlet opening communicates with the chamber at a point higher than the liquid level therein, and a manually operated valve wholly controlling said air outlet opening to permit the escape of air from said chamber but to maintain a pressure greater than atmosphere in said chamber.

21. In combination, a closed chamber, a pipe leading from a well into such chamber, an air nozzle in such pipe below such chamber, a pipe leading from such chamber and opening into the main space within the chamber below the liquid level therein and by a passageway which carries the liquid from the chamber first upward and then downward, said chamber having an air outlet opening therefrom which air outlet opening communicates with the chamber at a point higher than the liquid level therein, and a manually operated valve wholly controlling said air outlet opening to permit the escape of air from said chamber but to maintain a pressure greater than atmosphere in said chamber.

22. In combination, a closed chamber, a pipe leading from a well into such chamber, an air nozzle in such pipe below such chamber, a pipe leading from such chamber and opening into the main space within the chamber below the liquid level therein, said chamber having an air outlet opening therefrom which air outlet opening communicates with the chamber at a point higher than the liquid level therein, and a manually operated valve wholly controlling said air outlet opening to permit the escape of air from said chamber but to maintain a pressure greater than atmosphere in said chamber.

In witness whereof, I have hereunto set my hand, at Indianapolis, Indiana, this 3rd day of July, 1917.

ORAN M. PRUITT.